J. W. EGGLESTON.
EGG FILLER.
APPLICATION FILED JAN. 13, 1914.
1,156,219.
Patented Oct. 12, 1915.
2 SHEETS—SHEET 1.
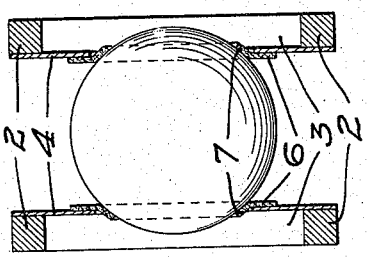
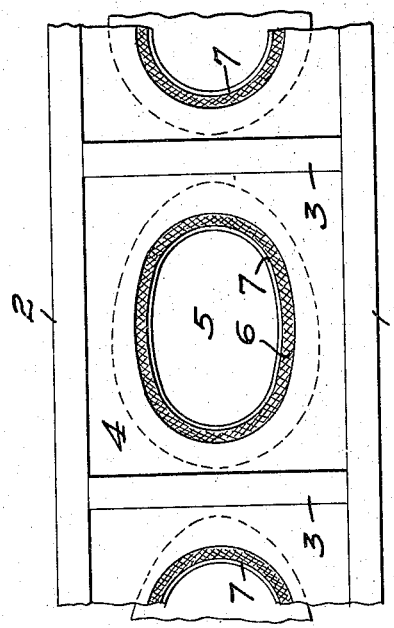
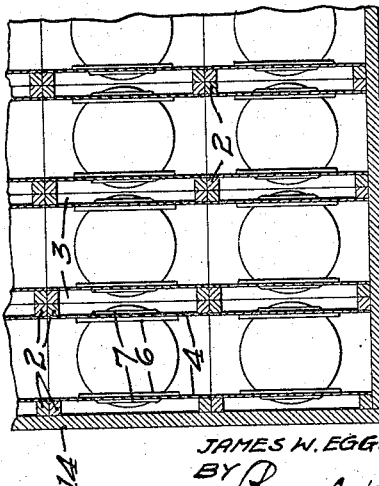
WITNESSES
INVENTOR
JAMES W. EGGLESTON
BY
ATTORNEYS J. W. EGGLESTON.
EGG FILLER.
APPLICATION FILED JAN. 13, 1914.
1,156,219.
Patented Oct. 12, 1915.
2 SHEETS—SHEET 2.
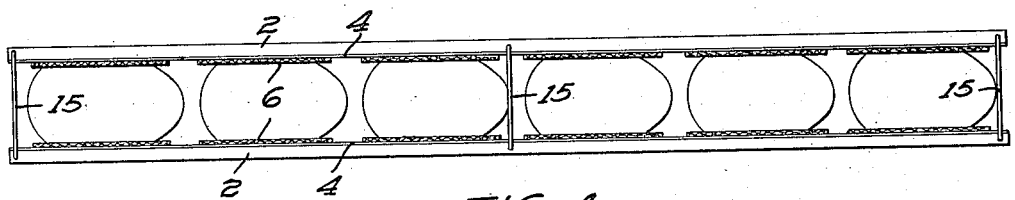
FIG. 4.
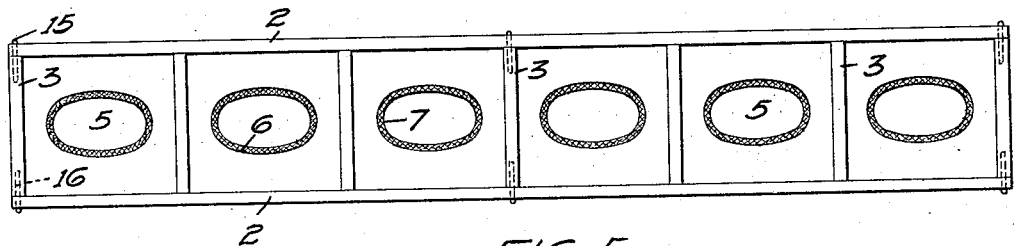
FIG. 5.
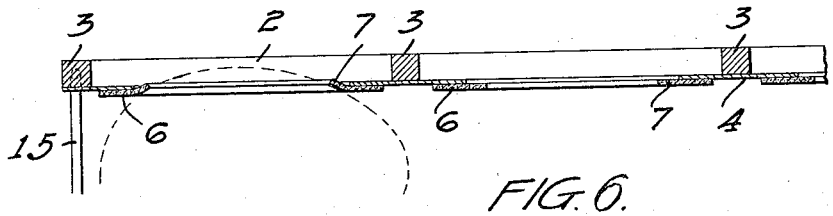
FIG. 6.
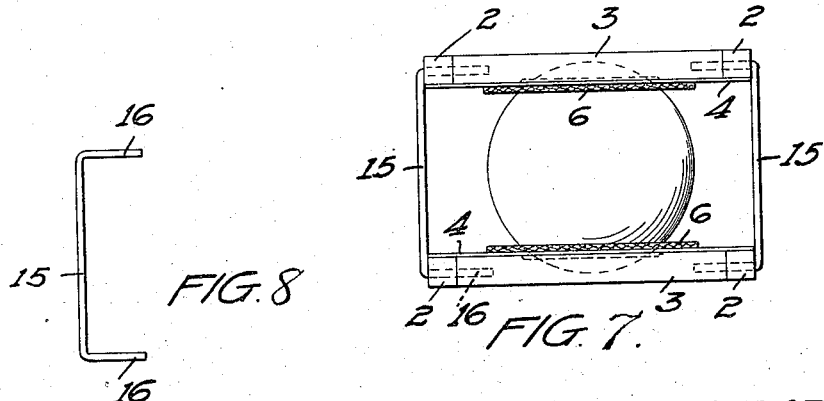
FIG. 8.
FIG. 7.
WITNESSES
M. R. McInnis
E. A. Paul
INVENTOR
JAMES W. EGGLESTON
BY
Paul & Paul
ATTORNEYS

UNITED STATES PATENT OFFICE.

JAMES W. EGGLESTON, OF MINNEAPOLIS, MINNESOTA.

EGG-FILLER.

1,156,219. Specification of Letters Patent. Patented Oct. 12, 1915.

Application filed January 13, 1914. Serial No. 811,837.

*To all whom it may concern:*

Be it known that I, JAMES W. EGGLESTON, citizen of the United States, resident of Minneapolis, county of Hennepin, State of Minnesota, have invented certain new and useful Improvements in Egg-Fillers, of which the following is a specification.

My invention relates to egg fillers which will support the eggs without allowing them to come in contact with the wall of the box or container in which they are packed, and which will also prevent them from moving around in the case or coming in contact with one another.

A further object is to provide a filler composed of a series of separable units or sections of conpact, durable construction.

Other objects of the invention will appear from the following detailed description.

The invention consists generally in various constructions and combinations, all as hereinafter described and particularly pointed out in the claims.

In the accompanying drawings forming part of this specification, Figure 1 is a detail plan view showing the pockets in which the eggs are seated, Fig. 2 is a transverse sectional view of the filler section, Fig. 3 is a vertical sectional view, showing the fillers packed into the case for shipping purposes, Fig. 4 is a side view of a filler section embodying my invention, Fig. 5 is a plan view of the same, Fig. 6 is a detail sectional view showing the means for fastening the upper and lower portions of the filler together. Fig. 7 is an enlarged detail view of the fastening means in use, Fig. 8 is a view of the fastening means removed from the filler.

In the drawing, 2 represents side rails and 3 cross bars connecting them with one another, said rails and cross bars being of any suitable material, preferably wood. A plate 4 of suitable material, preferably straw-board, is secured to the rails 2 and forms therewith a panel of the filler. There are two of these panels in each filler section, an upper and a lower one, formed in substantially the same way, each provided with openings 5, substantially oval in form, to receive an egg, and around each opening a seat 6 of flexible material is placed, having an inner edge or flap 7 which forms a yielding seat for the egg. These upper and lower panels are of substantially the same construction and interchangeable.

In filling the egg section, the eggs are placed in the pockets therein and the upper section placed over the lower one, the upper portions of the eggs fitting into the openings in the upper panel and the lower portions of the eggs fitting into the openings in the lower panel, the panels on each side projecting a sufficient distance beyond the eggs to protect them from breakage. When the free ends of the panels are fastened together, the eggs can be handled without danger of breakage.

In Fig. 3 a case or container 14 is illustrated, in which the filler sections may be packed side by side and one above another, until the case is completely filled. The filler sections being rectangular in cross section, will fit snugly together and the yielding seats in the filler sections will hold the eggs out of contact with the frames of the sections and out of contact with each other and the wall of the case or container.

To hold the panels apart and in parallel relation I provide spreaders 15 having end portions 16 bent at right angles substantially to the middle portions thereof and fitting into sockets provided in the upper and lower panels of the filler. I prefer to provide two of these spreaders at each end and two in the middle, operating to hold the panels apart and prevent them from bearing on the eggs with sufficient pressure to crush the shells. These spreaders are preferably made of suitable gage of wire and may be thrust into the sockets in the panels and as readily withdrawn therefrom.

In various ways the details of construction herein shown and described may be modified without departing from the spirit of my invention.

I claim as my invention:

1. An egg filler comprising upper and lower panels, each having side rails and cross bars at intervals between them, and plates secured to said rails and cross bars, said plates having holes oppositely arranged therein adapted to receive eggs fitting within said holes and held by the walls thereof against lateral movement, and means having angled ends to engage sockets in said panels for holding them in parallel relation with one another and resisting exterior or interior pressure thereon.

2. An egg filler comprising panels arranged in parallel relation with one another and having opposing openings therein to receive the eggs placed between said panels, said panels having sockets formed therein and rods having ends bent to enter said sockets and resist exterior pressure on said panels.

3. An egg filler comprising an upper and a lower panel, each having side rails and intermediate cross bars between them, sheets of straw-board secured to the opposing faces of said panels and having openings therein at intervals opposite one another to receive the eggs placed between said panels, said panels having sockets therein and rods having ends bent at right angles to their middle portions and fitting within said sockets and holding said panels in parallel relation with one another.

4. The combination, with a case, of a plurality of egg fillers fitting therein, said fillers being rectangular in form and comprising parallel side rails and intermediate cross bars securing them together, plates secured to the opposing faces of said rails, said rails having sockets extending inwardly at intervals therein, rigid means having ends to enter said sockets for holding said rails and plates apart and in parallel relation with one another and resisting outward and inward pressure.

In witness whereof, I have hereunto set my hand this 7th day of January 1914.

JAMES W. EGGLESTON.

Witnesses:
EDWARD A. PAUL,
GENEVIEVE E. SORENSEN.

Copies of this patent may be obtained for five cents each, by addressing the "Commissioner of Patents, Washington, D. C."